United States Patent
Tabuchi

(10) Patent No.: US 10,862,410 B2
(45) Date of Patent: Dec. 8, 2020

(54) MULTI-MOTOR SYSTEM

(71) Applicant: Nidec Corporation, Kyoto (JP)

(72) Inventor: Tetsuya Tabuchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/470,992

(22) PCT Filed: Dec. 21, 2017

(86) PCT No.: PCT/JP2017/045952
§ 371 (c)(1),
(2) Date: Jun. 19, 2019

(87) PCT Pub. No.: WO2018/117222
PCT Pub. Date: Jun. 28, 2018

(65) Prior Publication Data
US 2020/0028453 A1   Jan. 23, 2020

(30) Foreign Application Priority Data
Dec. 22, 2016   (JP) .................................. 2016-250022

(51) Int. Cl.
*H02P 6/04* (2016.01)
*H02P 5/46* (2006.01)

(52) U.S. Cl.
CPC .................. *H02P 6/04* (2013.01); *H02P 5/46* (2013.01); *H02P 2006/045* (2013.01)

(58) Field of Classification Search
CPC ..................................... H02P 6/04; H02P 5/46
USPC ........................................................... 318/34
See application file for complete search history.

(56) References Cited

U.S. PATENT DOCUMENTS

| 3,969,615 A * | 7/1976 | Bowers .............. G05B 19/4103 700/189 |
| 4,685,114 A * | 8/1987 | Welling ................. H03M 1/682 370/212 |
| 2008/0162088 A1* | 7/2008 | DeVaul ................ A61B 5/0024 702/190 |

(Continued)

FOREIGN PATENT DOCUMENTS

| EP | 1 906 390 A2 | 4/2008 |
| JP | 10-83215 A | 3/1998 |

(Continued)

OTHER PUBLICATIONS

Official Communication issued in International Patent Application No. PCT/JP2017/045952, dated Mar. 13, 2018.

*Primary Examiner* — Kawing Chan
(74) *Attorney, Agent, or Firm* — Keating & Bennett

(57) ABSTRACT

A multi-motor system includes motor assemblies, each including a motor, a communication circuit to receive a command transmitted from outside, a control circuit to generate a control signal that rotates the motor with a controlled variable that is designated by the command; and a motor driving circuit that causes a current to flow in the motor based on the control signal. The command includes control data indicating the controlled variable of the motor in fixed data length, the controlled variable being expressed at least with an integer, and position-designating data designating a position of the radix point in the control data. The position-designating data is independently determined for each motor assembly.

10 Claims, 11 Drawing Sheets

(56) References Cited

U.S. PATENT DOCUMENTS

| | | | |
|---|---|---|---|
| 2009/0112334 A1* | 4/2009 | Grichnik | F02D 41/26 |
| | | | 700/29 |
| 2009/0113186 A1* | 4/2009 | Kato | G06F 9/30025 |
| | | | 712/222 |
| 2010/0050025 A1* | 2/2010 | Grichnik | G05B 17/02 |
| | | | 714/47.2 |
| 2015/0012140 A1 | 1/2015 | Fang et al. | |
| 2015/0054839 A1 | 2/2015 | Aoyama et al. | |

FOREIGN PATENT DOCUMENTS

| | | |
|---|---|---|
| JP | 2003-285954 A | 10/2003 |
| JP | 2005-245129 A | 9/2005 |
| JP | 2009-081931 A | 4/2009 |
| JP | 2010-266976 A | 11/2010 |
| JP | 2016-134879 A | 7/2016 |
| WO | 2016/072308 A1 | 5/2016 |

\* cited by examiner

*FIG.1A*

| OSI REFER-ENCE MODEL | DATA LINK LAYER | | | | APPLICA-TION LAYER | | |
|---|---|---|---|---|---|---|---|
| FUNCTION | PRE-AMBLE | Start of Frame | RECEIVING-END DEVICE ID | TRANSMIT-TING-END DEVICE ID | COMMON DATA STRUCTURE | CHECK-SUM | End of Frame |
| SIZE (BYTES) | 2 | 1 | 1 | 1 | 3~13 | 1 | 1 |

10　11　12

1a

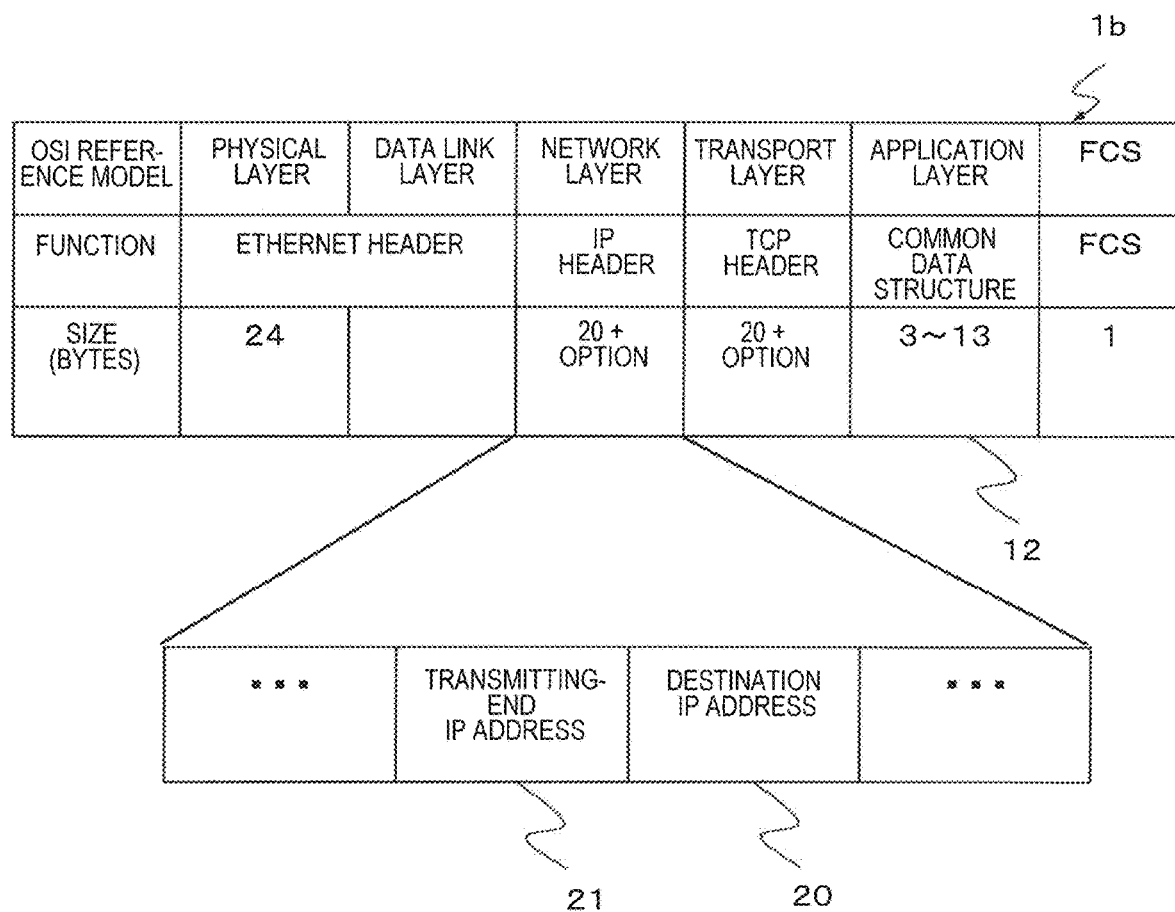

30a

30b

30c

MULTI-MOTOR SYSTEM

CROSS REFERENCE TO RELATED APPLICATIONS

This is a U.S. national stage of PCT Application No. PCT/JP2017/045952, filed on Dec. 21, 2017, and priority under 35 U.S.C. § 119(a) and 35 U.S.C. § 365(b) is claimed from Japanese Application No. 2016-250022, filed Dec. 22, 2016, the entire disclosures of each application are incorporated herein by reference.

1. FIELD OF THE INVENTION

The present disclosure relates to a multi-motor assembly system.

2. BACKGROUND

When a controlled variable of a motor, e.g., a target position or a target rotational speed, is to be commanded from outside, it has conventionally been the case that an external device and the motor would perform communications in accordance with a predefined description rule for the motor-controlled variable. A specific example of "a description rule for a motor-controlled variable" may be a rule that the data of any motor-controlled variable to be transmitted or received on the same network should have its integer part stated in 16 bits and its fractional part in 16 bits, in accordance with a Q representation (Q format).

Since the external device and the motor both perform communications in accordance with the aforementioned description rule, there would not be discrepancies between an interpretation of the motor-controlled variable by the external device being the controlling end and an interpretation of the motor-controlled variable by the motor being the controlled end. As a result of this, a motor control for properly conforming to the target position and target rotational speed has been realized.

For example, Japanese Laid-Open Patent Publication No. 2003-285954 discloses an image forming apparatus, such as a printer, a facsimile machine, or the like. The image forming apparatus includes a paper-feeding device which is used to convey a paper sheet as an image recording medium. In accordance with an instruction from outside, a paper-feeding means in the paper-feeding device conveys the paper sheet to a desired position. A detection means detects a manipulated amount of the paper-feeding means, and a computation means computes a controlled variable of a motive unit in the paper-feeding means so that the detected manipulated amount will match an externally-designated manipulated amount. Based on the computed controlled variable, a control means controls the motive unit in the paper-feeding means. The computation means, which has a fixed computation bit length, uses fixed-point type data whose integer part is expressed in the upper J bits, and whose fractional part is expressed in the lower K bits, to compute the controlled variable of the motive unit. The numbers of bits J and K of the integer part and fractional part of the data are set by a setting means so that the number K of bits in the fractional part will increase as the manipulated amount of the paper-feeding means decreases.

When a plurality of motors, such that the controlled variables of the respective motors are in different units of measurement, are connected via the same network, if the upper device on the control end transmits the data of a motor-controlled variable under a given rule, some of the motors on the receiving end may misunderstand the motor-controlled variable. Therefore, it has not been possible to allow all motors to properly operate.

As a matter of communication rules, if the units of motor-controlled variables are made identical across all motors, motors on the receiving end will be prevented from misunderstanding motor-controlled variables. However, the motor-controlled variables may not be stated in controlled variable units of measurement that are suitable for controlling the respective motors, so that, depending on the motor, the precision of the controlled variable may be too poor, or the precision may be too high.

A technique is needed to set the unit of measurement of a motor-controlled variable with a precision which is in accordance with each motor assembly.

SUMMARY

A multi-motor system according to an example embodiment of the present disclosure is a multi-motor system including a plurality of motor assemblies, each of the plurality of motor assemblies including a motor, a communication circuit to receive a command which is transmitted from outside, a control circuit to generate a control signal that rotates the motor with a controlled variable that is designated by the command, and a motor driving circuit to cause a current to flow in the motor based on the control signal. The command includes control data indicating the controlled variable of the motor in fixed data length, the controlled variable being expressed at least with an integer, and position-designating data designating a position of a radix point in the control data, and the position-designating data is independently determined for each motor assembly.

With a multi-motor system according to an example embodiment of the present disclosure, even if a plurality of motor assemblies are connected via the same network, such that the controlled variables of the respective motors are in different units of measurement, a unit of measurement of the motor-controlled variable is independently set for each motor, with a precision that is adapted to the respective motor assembly. This makes it possible to appropriately set a unit of measurement of the controlled variable of each motor in a motor-by-motor manner, in controlling rotation of the motor.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1A is a diagram showing the structure of a data frame 1a for use in wired serial communications according to an example embodiment of the present disclosure.

FIG. 1B is a diagram showing the structure of a data frame 1b for use in wireless communications according to an example embodiment of the present disclosure.

DETAILED DESCRIPTION

Figure 2:
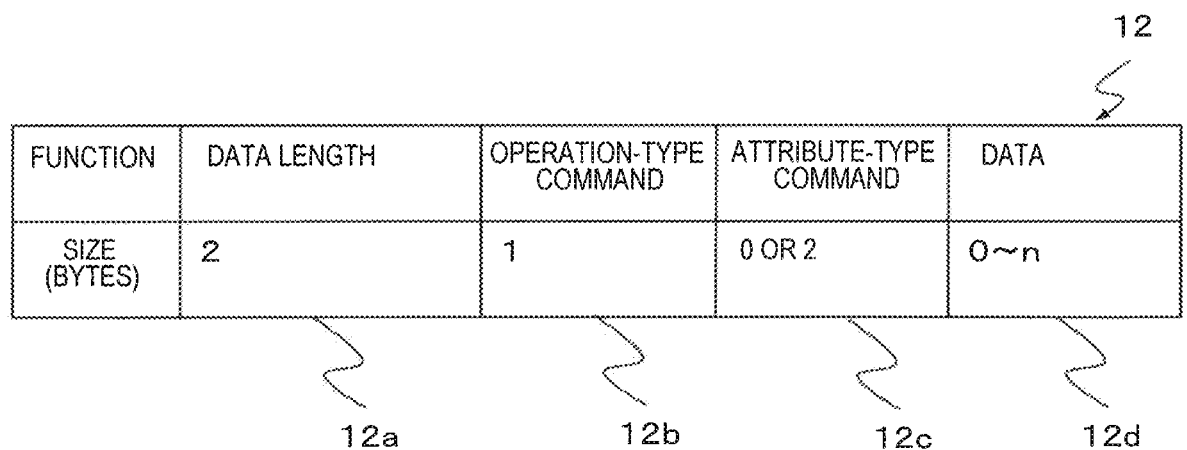
FIG. 2 is a diagram showing a common data structure 12 according to an example embodiment of the present disclosure.

A multi-motor system including a plurality of motors according to the present disclosure receives a command which is transmitted from outside, e.g., an upper device or another multi-motor system or motor assembly, and controls each motor to rotate in accordance with this command.

Hereinafter, with reference to the attached drawings, a communications protocol in performing transmission and reception between an external device and the multi-motor system will be described first. Thereafter, the construction and operation of the multi-motor system will be described.

FIG. 1A shows the structure of a data frame 1a for use in wired serial communications. As an example of serial communication, communications under the RS-485 standard are contemplated. The RS-485 standard defines electrical specifications in the physical layer as referred to in the OSI reference model.

The data frame 1a includes various data. For reference sake, in the uppermost row of FIG. 1A, layer-to-layer classifications according to the OSI reference model are shown. In the lowermost row of FIG. 1A, the data size of each data is shown in bytes. The leftmost column in FIG. 1A contains legend. The same also applies to FIG. 1B and FIG. 2 to be referred to later.

For example, the data frame 1a contains a receiving-end device ID 10, a transmitting-end device ID 11, and a common data structure 12. The receiving-end device ID 10 is an identifier identifying a device on the receiving end. The transmitting-end device ID 11 is an identifier identifying a device on the transmitting end. The device on the transmitting end may be, besides an upper device, another multi-motor system. The identifier may be an ID (a device identifier or a device ID) or an IP address which, during manufacture, was assigned to each device without repetition, for example. The device ID or IP address is an identifier uniquely indicating a motor assembly within the communications network. The common data structure 12 is a data structure including one or two commands as described later.

Previously, in order to control a motor, it has been sufficient if there only exists a device ID on the receiving end that identifies a motor to be controlled because, once control data is sent while designating a receiving-end device ID, the motor will operate in accordance with the control data.

The inventors have sought to establish a multi-motor system never conceived of before, in which a plurality of motors communicate with one another and which as a whole operates in a cooperative manner. Believing that a new communications protocol is needed to for that purpose, the inventors have newly defined the transmitting-end device ID 11 and the common data structure 12.

FIG. 1B shows the structure of a data frame 1b for use in wireless communications. An example of wireless communication is contemplated to be communications under the Wi-Fi (registered trademark; the same is also true hereinbelow) standards. The Wi-Fi standards define the specifications of the physical layer and the data link layer as referred to in the OSI reference model.

The data frame 1b includes a plurality of headers for the respective layers in the OSI reference model. To begin with, an IP header is supposed to store a destination IP address 20 and a transmitting-end IP address 21. The inventors have thought that transmitting-end IP address 21 could be utilized as an identifier corresponding to the aforementioned transmitting-end device ID 11. Accordingly, the inventors have decided to utilize the transmitting-end IP address 21 in a communications protocol which is carried out by using the common data structure 12 under the Wi-Fi standards.

Note that the aforementioned wired communication and wireless communication are only exemplary. Any other communications protocol may be used. In a communication system which performs inter-motor communications for controlling motors, the inventors have decided to utilize an identifier that uniquely indicates a transmitting end. Therefore, in any communication system which performs inter-motor communications, the present disclosure is applicable so long as an identifier uniquely indicating a transmitting end is contained in the header or the like. In other words, even in an existing communications protocol, so long as an identifier indicating a transmitting end is contained, it can be utilized for inter-motor communications as an identifier corresponding to the transmitting-end device ID 11.

FIG. 2 shows the common data structure 12.

The common data structure 12 includes a data length field 12a, an operation-type command field 12b, an attribute-type command field 12c, and a data field 12d.

The data length field 12a represents the total number of bytes in the common data structure 12.

The operation-type command field 12b represents an operation-type command for operating the motor, for example. The operation-type command is stated as a numeric value (binary representation) that corresponds to the operation-type command. Examples of operation-type commands are Write Data, Read Data, Execution, and Connect. Write Data, Read Data, etc., are operations to be performed by a motor assembly in connection with a motor operation. In other words, an operation-type command can be said to be a request from another motor assembly, or a request to another motor assembly, that designates an operation to be performed by the motor assembly.

The attribute-type command field 12c indicates an attribute-type command that designates an attribute concerning the motor. An attribute-type command is also stated as a numeric value (binary representation) that corresponds to the command. Examples of attribute-type commands are Present Angle, Target Angle, Angle Limit, and Serial Number. An attribute-type command can be said to be a static or dynamic attribute, concerning the motor, that is designated together with an operation-type command.

In the data field 12d, data for the attribute-type command field 12c is stated. Examples of data are an angle setting value, a rotational speed setting value, and a serial number value.

The aforementioned common data structure has a relatively short data length that fits in a range from 3 bytes to 13 bytes, for example. EtherCAT, which is another communications protocol, is 32 bytes in size and therefore is able to eliminate congestion and suppress occupancy on the communications paths during communications; furthermore, since operation-type commands and attribute-type commands are separately defined, it is easier for the user (programmer) to understand.

The commands to be stored in the operation-type command field 12b and the attribute-type command field 12c will be described in conjunction with subsequent example embodiments.

Next, an illustrative example embodiment of a multi-motor system will be described.

Instances are increasing where a plurality of motor assemblies are mounted on a single product. In such products, there is an increasing need for a given motor assembly to communicate with other motor assemblies.

Figure 3A:
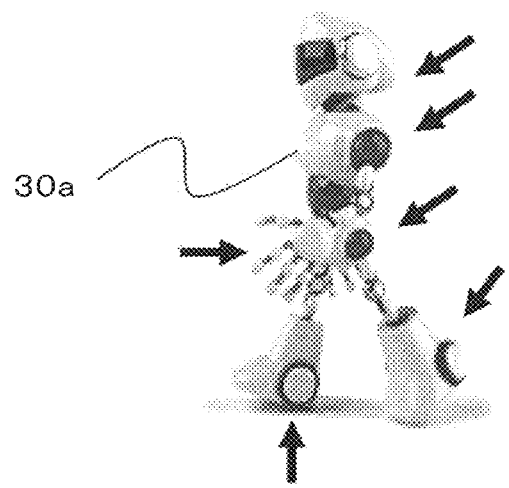
FIG. 3A is a diagram showing the appearance of a communication robot 30 according to an example embodiment of the present disclosure.
Figure 3B:
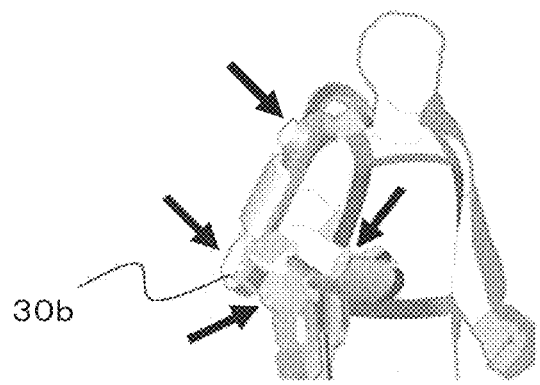
FIG. 3B is a diagram showing the appearance of a powered exoskeleton suit 30b according to an example embodiment of the present disclosure.
Figure 3C:
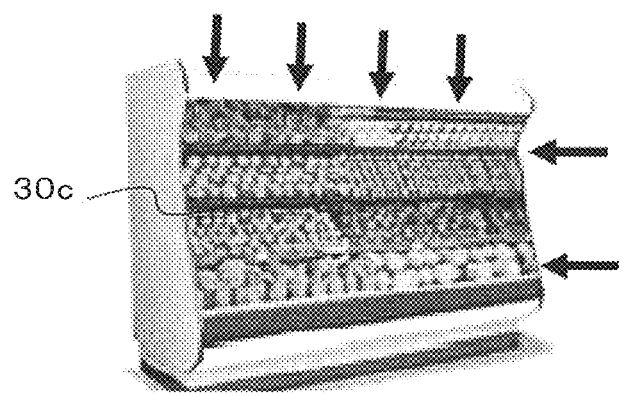
FIG. 3C is a diagram showing the appearance of a commercial refrigerated showcase 30c according to an example embodiment of the present disclosure.

For example, FIG. 3A through FIG. 3C illustrate examples of products having a plurality of motor assemblies mounted thereon.

FIG. 3A shows the appearance of a communication robot 30a. A motor assembly is mounted at each position on the communication robot 30a that is indicated with an arrow. The single communication robot 30a may have about 20 or more motor assemblies attached thereto. As a result of this, the robot 30 is able to achieve complicated motions.

FIG. 3B shows the appearance of a powered exoskeleton suit 30b. The powered exoskeleton suit 30b is used for agricultural field work, care-giving work, and so on. As in the example of FIG. 3A, motor assemblies are mounted on the respective positions indicated with a plurality of arrows. Although the arrows mainly point to only motor assemblies on the right half of the body, motor assemblies are also similarly provided on the respective positions on the left half of the body, correspondingly to the right half of the body. For example, in order to provide assistance for arm strength and leg strength, 20 or more motor assemblies may be used on the powered exoskeleton suit 30b. For reference sake, FIG. 3B illustrates the silhouette of a person wearing the powered exoskeleton suit 30b.

FIG. 3C shows the appearance of a commercial refrigerated showcase 30c. Motor assemblies are mounted on the respective positions indicated with arrows. The single commercial refrigerated showcase 30c may have 10 or more fan motor assemblies attached thereto. This can provide an enhanced cooling efficiency.

In the present example embodiment, the plurality of motor assemblies that are included in any such single device communicate with one another, so as to operate autonomously and cooperatively.

For example, suppose that one of the plurality of fan motor assemblies mounted on the commercial refrigerated showcase 30c is malfunctioning. Even though the malfunctioning fan motor assembly may have stopped rotating, if the other fan motor assemblies maintain their states of rotation as ever, then the cooling efficiency will lower.

Therefore, malfunctioning of a given motor assembly is notified by that fan motor assembly (hereinafter abbreviated as the "malfunctioning unit") itself, to the other fan motor assemblies; alternatively, any other fan motor assembly may detect a loss of communication with that malfunctioning unit. Then, among the plurality of fan motor assemblies, two fan motor assemblies that are near the malfunctioning unit change their own operations. Specifically, the two fan motor assemblies undergo alternating increases and decreases in rotational speed, so as to operate in place of the malfunctioning fan motor assembly. As a result, cooling efficiency can be maintained, and temperature distribution can be prevented from occurring.

In the present example embodiment, a command for rotating the motor assembly that is provided in each joint of the communication robot 30a is transmitted from an external device such as an upper device.

Figure 4:
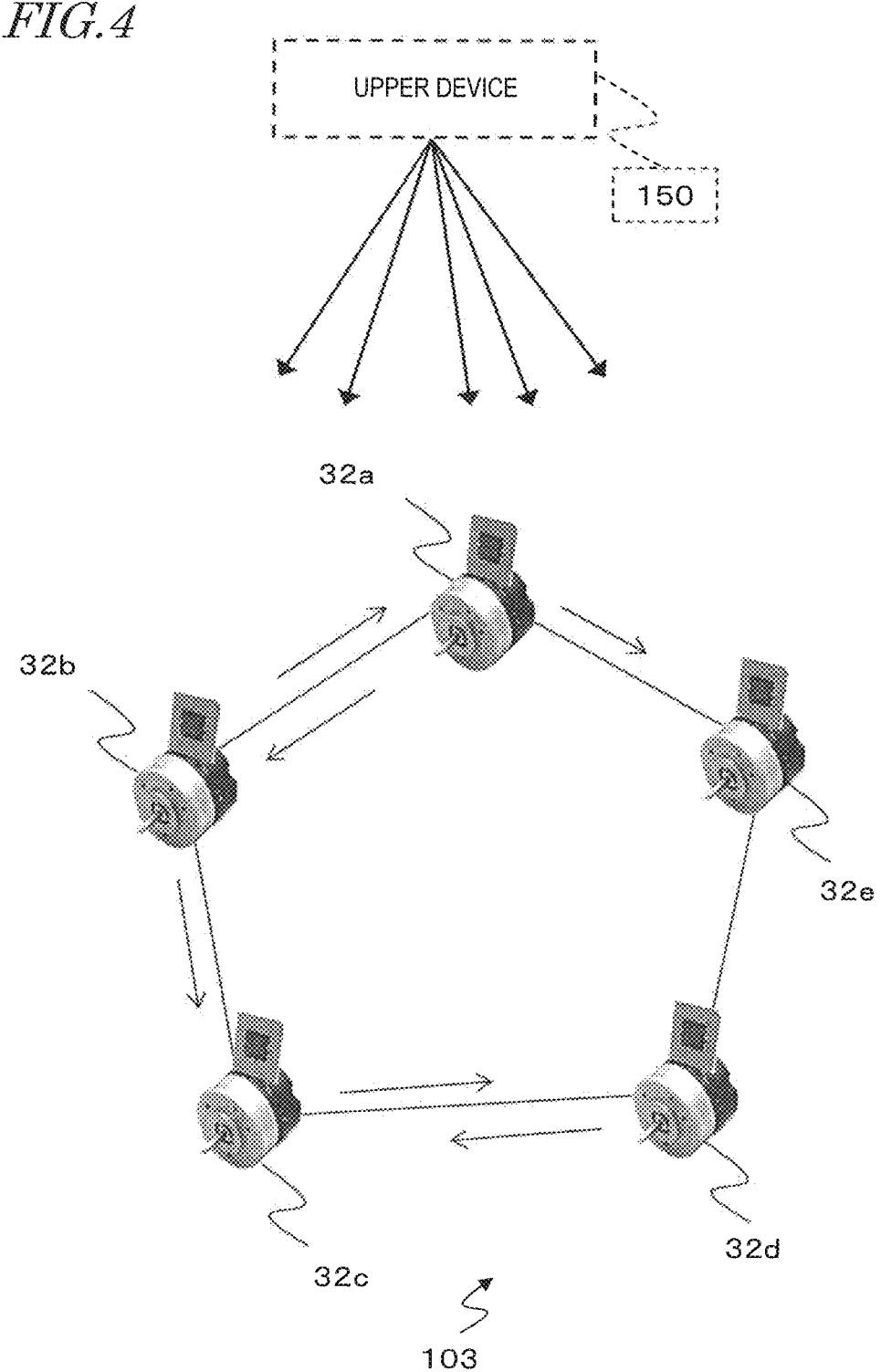
FIG. 4 is a schematic diagram of a multi-motor assembly system 103 according to an example embodiment of the present disclosure.

FIG. 4 is a schematic diagram of a multi-motor assembly system 103 according to the present example embodiment. The multi-motor system 103 includes a plurality of motor assemblies 32a through 32e. As will be described later, each motor assembly includes a motor and various circuit elements.

Each of the motor assemblies 32a through 32e begins operation in accordance with a command within a data frame which is transmitted from an upper device 150. The plurality of motor assemblies 32a through 32e may communicate with one another. In the multi-motor system 103 in FIG. 4, motor assemblies that are capable of communicating with each other are shown to be connected with lines, and flows of data are indicated by arrows; however, these illustrated lines and arrows are only an example. Any motor assemblies that are not connected with lines can also communicate with each other. Moreover, each motor assembly may transmit a data frame to the upper device 150.

Figure 5A:
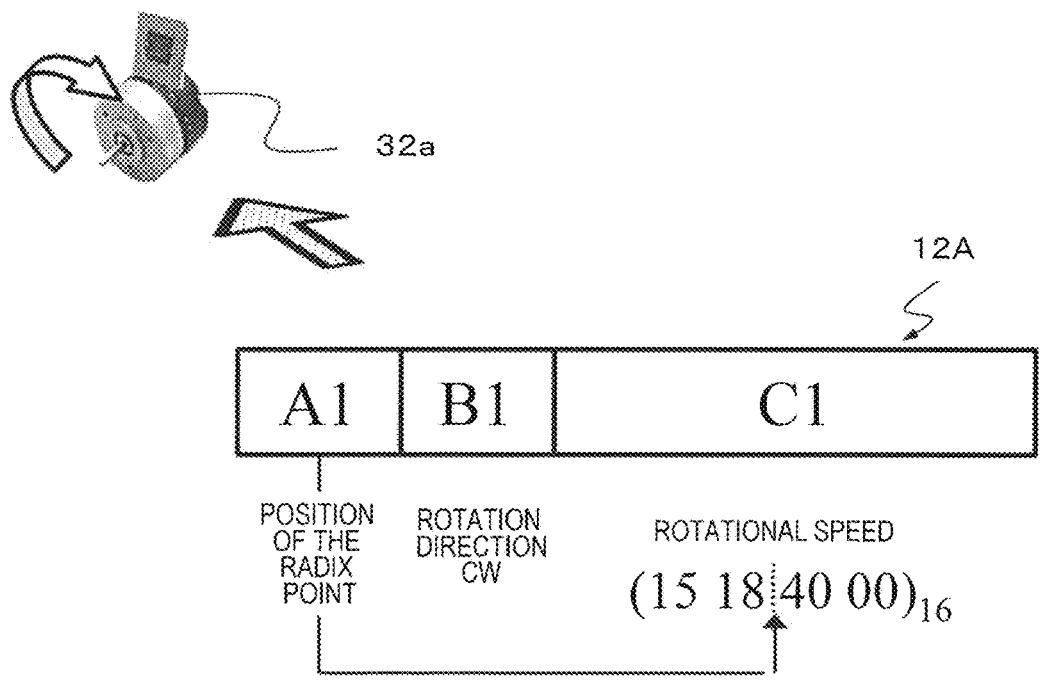
FIG. 5A is a diagram showing the outline of a command 12A to be used in the multi-motor system 103.
Figure 5B:
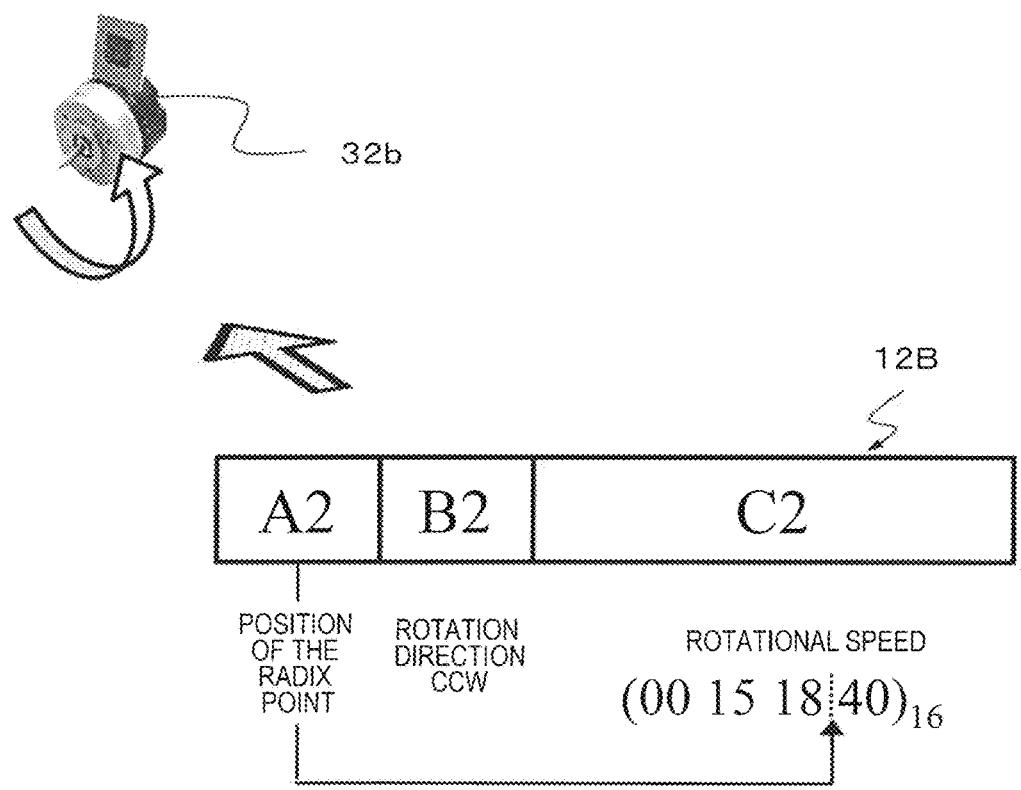
FIG. 5B is a diagram showing the outline of a command 12B to be used in the multi-motor system 103.

FIG. 5A and FIG. 5B show the outline of commands 12A and 12B to be used in the multi-motor system 103 according to the present example embodiment. Although the commands 12A and 12B are defined in the common data structure 12 illustrated in FIG. 2, FIG. 5A and FIG. 5B only show a portion out of the whole.

First, FIG. 5A is referred to. FIG. 5A shows a schematic structure of the command 12A to be transmitted to the motor assembly 32a. The command 12A contains three kinds of data, specifically: position-designating data A1 designating a position of the radix point of control data; rotation direction data B1 designating a rotation direction of the motor; and control data C1 indicating a controlled variable of the motor.

The position-designating data A1 designates a position of the radix point of the control data C1. The rotation direction data B1 designates a rotation direction of the motor of the motor assembly 32a. The control data C1 indicates the rotational speed of the motor, for example. In the control data C1, a numeric value representing a controlled variable of the motor is stated in fixed length. In this example, it is assumed that the numeric value representing a controlled variable of the motor has 4 bytes. In other words, the numeric value is expressed by using hexadecimal numbers in 4 sets, each set consisting of 2 digits, corresponding to binary 32 bits. The illustration in FIG. 5A is based on hexadecimal numbers in 4 sets, each set consisting of 2 digits. FIG. 5B is also similarly illustrated.

In FIG. 5A, the position-designating data A1 refers to the position between the lower $2^{nd}$ set and $3^{rd}$ set of the control data C1. In other words, the upper 2 sets (4 digits) of the control data C1 are an integer part of the controlled variable of the motor, while the lower 2 sets (4 digits) are a fractional part of the controlled variable of the motor. In the example of FIG. 5A, 5400.25 (rpm) is being designated as a target rotational speed.

On the other hand, in FIG. 5B, a schematic structure of the command 12B to be transmitted to the motor assembly 32b is shown. The construction of the command 12B in FIG. 5B is similar to the construction of the command 12A in FIG. 5A. Hereinafter, regarding the command 12B, any data structure that is identical to that of the command 12A in FIG. 5A will be omitted from explanation.

In FIG. 5B, the position-designating data A2 refers to the position between the lower $1^{st}$ set and $2^{nd}$ set of the control data C1. The upper 3 sets (6 digits) are an integer part of the controlled variable of the motor, while the lower 1 set (2 digits) is a fractional part of the controlled variable of the motor. In the example of FIG. 5B, too, 5400.25 (rpm) is being designated as a target rotational speed.

The control data C1 and C2 are stated in fixed length. However, the different positions of their radix points result in different expressible ranges of numeric values. In the above example, the command 12A has a larger amount of data assigned to the fractional part than in the case of the command 12B. Therefore, using the command 12A will allow for fine motor control. On the other hand, the command 12B has a large amount of data assigned to the integer part than in the case of the command 12A. Therefore, using the command 12A will allow the motor to rotate rapidly.

Given a motor of the same performance, using the position-designating data A1 and the control data C1 will allow motor rotation to be controlled in a very wide range of rotational speed. In the case where motor assemblies with motor assemblies having different performances are mixedly present, using the position-designating data A1 and the control data C1 will allow control data C1 with a necessary precision for each motor assembly to be provided.

In FIG. 5A and FIG. 5B, the position-designating data A1 may indicate that the entirety of the control data C1 and C2 are an integer part. In other words, it may indicate that the integer part encompasses down to the least significant digit of the control data. Thus, it is possible to designate only an integer value, by using the control data.

A number represented in a fixed-point notation may have its fractional part represented in a number of bits, based on a Q representation (Q format). When only the integer part exists, such that the number of digits in the fractional part is 0 (bits), a Q0 format may be chosen; when the number of digits in the fractional part is 8 bits, a Q8 format; and when the number of digits in the fractional part is 16 bits, a Q16 format.

Now, a problem in the case where any control data that is adapted to the motor assembly is not transmitted will be described. Let there be a motor assembly A that operates based on control data whose "integer part is 16 bits and fractional part is 16 bits"; and a motor assembly B that operates based on control data whose "integer part is 24 bits and fractional part is 8 bits". It is assumed that the target rotational speed still remains 5400.25 (rpm).

For the respective motor assemblies A and B, the control data for the aforementioned target rotational speed needs to be expressed as follows. Note that each numeric value between parentheses is a hexadecimal representation.

control data for motor assembly A:
integer part $(15\ 18)_{16}$, fractional part $(40\ 00)_{16}$
control data for motor assembly B:
integer part $(00\ 15\ 18)_{16}$, fractional part $(40)_{16}$ In the case where the multi-motor system 103 only supports the control data format for the motor assembly A, and does not support the control data format for the motor assembly B, the control data for the motor assembly A will nonetheless be transmitted to the motor assembly B. However, if the control data for the motor assembly A is transmitted to the motor assembly B, the motor assembly B will interpret this control data to mean that its integer part is $(15\ 18\ 40)_{16}$ and its fractional part is $(00)_{16}$. In other words, the motor assembly B will interpret the target rotational speed to be 1382464.00 (rpm). As a result, excessive rotation of the motor may cause a malfunction, or the motor operation may stop for fear of exceeding the allowed limit.

Therefore, the inventors have decided to provide position-designating data that designates a position of the radix point within control data, thus allowing an integer part and a fractional part to be extracted from the control data. This makes it possible to transmit control data in a format which is acceptable to each motor assembly.

The choice regarding whether or not to provide data indicating a rotation direction of the motor may be made depending on the application. For example, for a motor whose rotation direction is constant, the rotation direction does not need to be designated.

In FIG. 5A and FIG. 5B, the values representing the rotational speed of the motor are stated as the control data C1 and C2; however, rotational speed is only exemplary. It may be any other parameter, e.g., torque or angle of rotation. Moreover, a ratio (%) against a maximum value of torque or rotational speed being defined as 100% may be stated.

It was illustrated in the above example that the expressible range of numeric values differs because of differing positions of the radix point. Hereinbelow, differences between the Q7 format and the Q0 format when the control data has a fixed length of 1 byte will be described.

In the Q7 format, the control data has its integer part stated in 1 bit and its fractional part in 7 bits. This control data is capable of expressing the following range:
(binary representation)
0.0000000 to 1.1111111
(decimal representation)
0 to 1.9921875 (by increments of 0.0078125)

In the Q0 format, on the other hand, the control data has its integer part stated in 8 bits and its fractional part in 0 bits. This control data is capable of expressing the following range:
(binary representation)
00000000 to 11111111
(decimal representation)
0 to 255 (by increments of 1)

As will be clear from the above example, depending on which Q format is adopted, the expressible range of values and their increments can be altered variously.

Hereinafter, the construction of a motor assembly and communications to be performed between motor assembly will be described.

Figure 6:
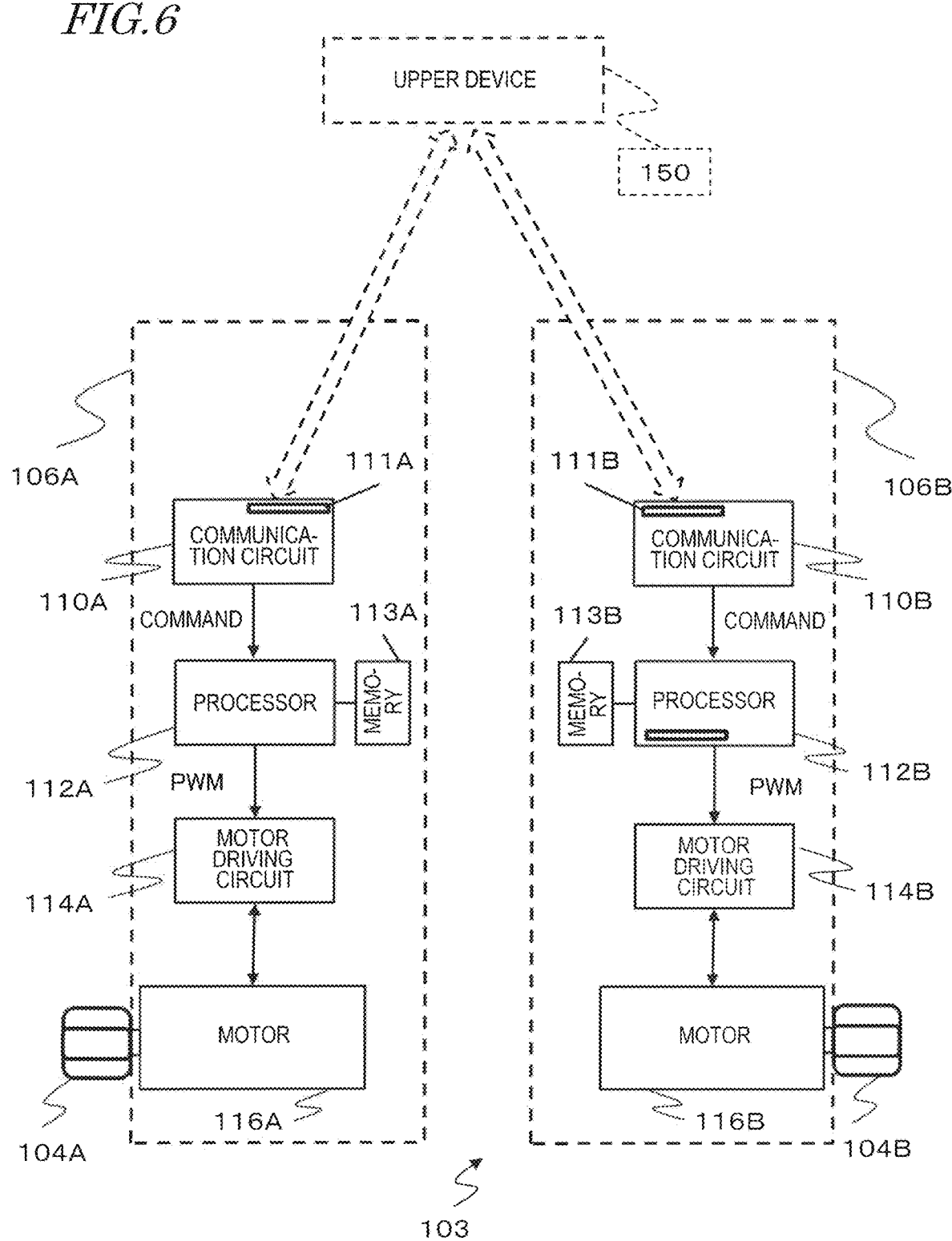
FIG. 6 is a diagram showing an exemplary construction of a multi-motor system 103 including motor assemblies that rotate joints in the communication robot 30 (FIG. 3A).

FIG. 6 shows an exemplary construction of a multi-motor system 103 including motor assemblies for rotating joints of the communication robot 30a (FIG. 3A), according to the present example embodiment. For convenience of illustration, the example of FIG. 6 shows two motor assemblies 106A and 106B; however, there may be three or more of them, as illustrated in FIG. 3A through FIG. 3C and FIG. 4.

The multi-motor system 103 includes motor assemblies 106A and 106B. The motor assembly 106A includes a communication circuit 110A, a processor 112A, a memory 113A, a motor driving circuit 114A, a joint motor 116A, and a joint mechanism 104A. The motor assembly 106B includes a communication circuit 110B, a processor 112B, a memory 113B, a motor driving circuit 114B, a joint motor 116B, and a joint mechanism 104B. The motor assemblies 106A and 106B may be referred to as Intelligent Motors (registered trademark). Although the above description illustrates that the joint mechanisms 104A and 104B respectively are included within the motor assemblies 106A and 106B, they may not be included therein.

In the present specification, the motor assemblies 106A and 106B receive a data frame, containing a command, from the upper device 150 shown in FIG. 6.

The communication circuits 110A and 110B include buffers 111A and 111B, respectively. Identifiers for respectively identifying the motor assemblies 106A and 106B are stored in the buffers 111A and 111B in advance. Each identifier may be a letter(s) and/or a number that is capable of unique identification in a communications network within a communicable range, and may be e.g. an IP address, or the aforementioned ID (device ID) that is assigned for each device without repetition.

When a data frame is received, each communication circuit 110A and 110B performs processing in the physical layer and the data link layer, and determines whether the receiving-end device ID 10 (FIG. 1A) in the data frame matches its own identifier stored in the buffers 111A and 111B. If they match, the communication circuit 110A or 110B continues the processing of the data frame; if they do not match, the communication circuit 110A and 110B discards the data frame.

In the case where wireless communications under the Wi-Fi standards are to be performed, an IP address can be adopted as the aforementioned identifier of its own. Each communication circuit 110A and 110B determines whether or not the destination IP address 20 (FIG. 1B) in the data frame matches its own IP address. The subsequent processes are identical to the above-described processes.

If processing of the data frame is to be continued, the communication circuit 110A or 110B further subjects the data frame sequentially to respective processes in the IP layer, the transport layer, etc., of the OSI reference model, and extracts the common data structure 12. As mentioned above, the common data structure 12 includes an operation-type command 12b and the like. The communication circuits 110A and 110B respectively extract the command and transmit it to the processors 112A and 112B.

The processors 112A and 112B are both semiconductor-integrated signal processors. A processor is also referred to as a "signal processing circuit" or a "control circuit". The processors 112A and 112B generate signals that rotate the motors 116A and 116B, respectively, at designated rotational speeds. The signals may be PWM signals, for example. Moreover, the processors 112A and 112B parse the command and data contained in the common data structure 12 that is included in the data frame which has been transmitted from another motor assembly, and performs a process which is in accordance with the content of the command.

The memory 113A and 113B previously retains a table in which other motor assemblies are mapped to the identifiers of the motor assemblies. In other words, an identifier is previously set in the communication circuit of each motor assembly, and this identifier is retained in the memory of any other motor assembly. Once the motor assembly with which to exchange a data frame is decided, the processor 112A or 112B can determine the identifier of that motor assembly, and instructs the communication circuit 111A or 111B of the identifier.

The motor driving circuits 114A and 114B allow a current of a magnitude and a direction that are in accordance with the PWM signals to flow in the motors 116A and 116B, respectively. As a result, the motor 116A or 116B rotates clockwise or counterclockwise. With the motor rotation, the joint mechanism 104A or 104B that is attached to a rotation shaft of the motor are driven clockwise or counterclockwise. As a result, the joint of the communication robot 30a (FIG. 3A) is bent with a direction and an angle that are in accordance with the motor rotation.

As for the command, the speed and time, etc., for rotating the motor 116A or 116B may be designated by utilizing the attribute-type command 12c and the data 12d (FIG. 2). At this time, designating a zero rotational speed could prevent the motor 116A or 116B from rotating. The processors 112A and 112B may generate PWM signals so that the motors 116A and 116B will rotate with the designated rotational speed and rotation time.

Next, a command to be transmitted from the upper device 150 will be described. Note that an external device other than the upper device 150 may alternatively transmit the command.

The upper device 150 transmits a "request to set a target rotational speed" to the motor assembly 106A, with the identifier of the motor assembly 106A being stated in the receiving-end device ID. The following assumes, as an example, that the motor assembly 106A corresponds to the Q20 format, and that the motor 116A of the motor assembly 106A is to be rotated in the clockwise (CW) direction with a target torque of 0090.00 (N·m).

Figure 7:
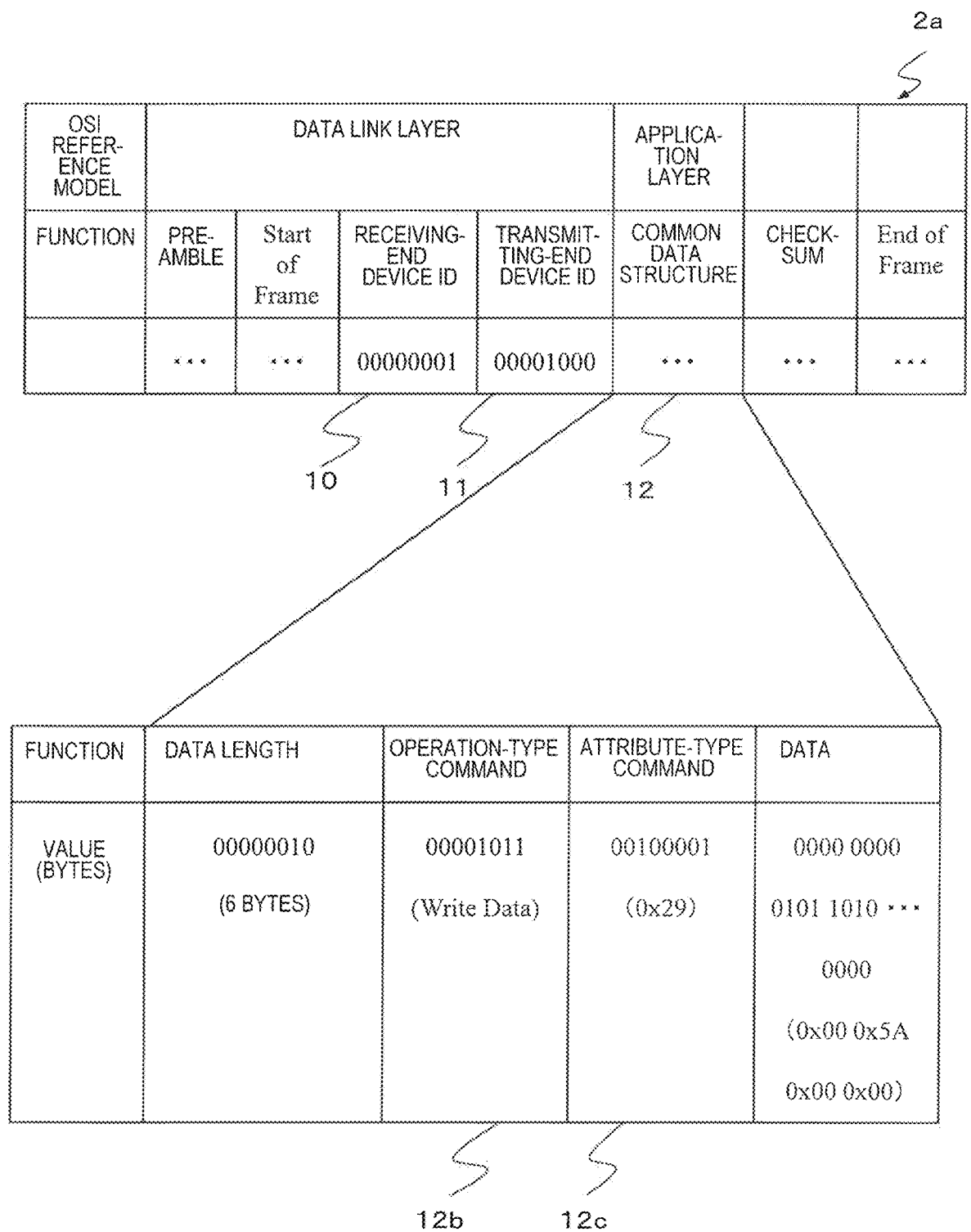
FIG. 7 shows an exemplary data frame 2a during communications under the RS-485 standard according to an example embodiment of the present disclosure.

FIG. 7 shows an exemplary data frame 2a during communications under the RS-485 standard. The data frame 2a corresponds to the data frame 1a of FIG. 1A. Although any example corresponding to the data frame 1b for use in wireless communications as illustrated in FIG. 1B will be omitted from the explanation, one skilled in the art should be able to understand it based on the example of FIG. 7.

In the data frame 2a, a 1-byte binary value "00000001" representing the motor assembly 106A is stated as the receiving-end device ID 10, and a 1-byte binary value "00001000" representing the upper device 150 is stated as the transmitting-end device ID 11. Note that the binary values are examples.

In the common data structure 12, as the operation-type command 12b, a binary value "00001011" (0x11) corresponding to a "Write Data" command for writing the target rotational speed is stated. Moreover, as the attribute-type command 12c, a binary value "00101001" (0x29) representing the following two attributes is stated.

Q20 Format
Rotation Direction: Clockwise (CW)

Note that the least significant bit of the binary 8-bit value expresses a rotation direction. In the case of clockwise (CW), "1" is set; in the case of counterclockwise (CCW), "0" is set. On the other hand, the lower 2-6 bits express a Q format (a binary number representing the number following Q). That is, the Q format is expressed in a length of 5 bits. The upper 2 bits are reserved to be "00".

The Q20 format indicates that 20 bits exist in the fractional part. This serves as "position-designating data", designating the position of the radix point (i.e., the position of the boundary between the integer part and the fractional part) in the value that is stated in the "data" to be described next, i.e., control data (target rotational speed).

Next, as the "control data", the following attribute is stated by using a fixed length of 4 bytes.

Target Torque 0090.00 (N·m)

In the above example, the entire command including the operation-type command and attribute-type command and the control data is stated in a fixed length of 5 bytes.

The processor 112A recognizes: that the upper device 150 has transmitted a command for data write; that the number of digits in the fractional part of the control data is 20; that rotation is to occur clockwise (CW); and that the target torque is 0090.00 (N·m). The processor 112A writes a flag indicating that the rotation direction is clockwise (CW), and a value of target rotational speed, to the memory 113A. Through the above process, the upper device 150 can set the target rotational speed to the motor assembly 106A.

Instead of target torque, or in addition to target torque, other controlled variables may also be stated, e.g., the magnitudes of target rotational speed, target rotation angle, and so on.

In the above description, the target torque, etc., is directly designated in an absolute amount. However, the controlled variable may be designated in a relative amount from a predefined, predetermined reference. For example, a target rotation angle relative to the present angle, a ratio (%) against a maximum value of rotational speed being defines as 100%, a rate of target torque against a maximum value of torque being defined as 100% (%), or various other control data may also be written. In these cases, too, the position of the radix point in the control data may be stated with position-designating data.

Figure 8A:
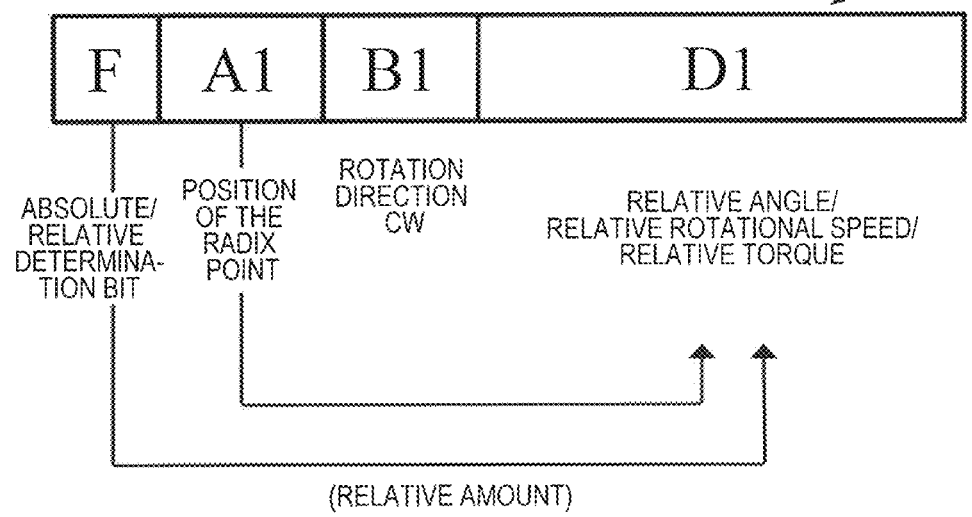
FIG. 8A is a diagram showing an exemplary command 12C in the case where a controlled variable D1 is designated in a relative amount according to an example embodiment of the present disclosure.

FIG. 8A shows an exemplary command 12C in the case where a controlled variable D1 is designated in a relative amount. FIG. 8A is drawn in a similar manner to FIG. 5A.

As compared to the example of FIG. 5A, at the beginning of the command 12C, an absolute/relative determination bit F is provided. The absolute/relative determination bit F indicates whether the controlled variable D1 of the command 12C is stated in an absolute amount, or stated in a relative amount. For example, if the controlled variable D1 is designated in an absolute amount, this bit is set to "0"; if it is designated in a relative amount, this bit is set to "1". Note that, as the values of the position of the radix point A1 and the rotation direction B1, values expressing relative amounts are to be set.

Figure 8B:
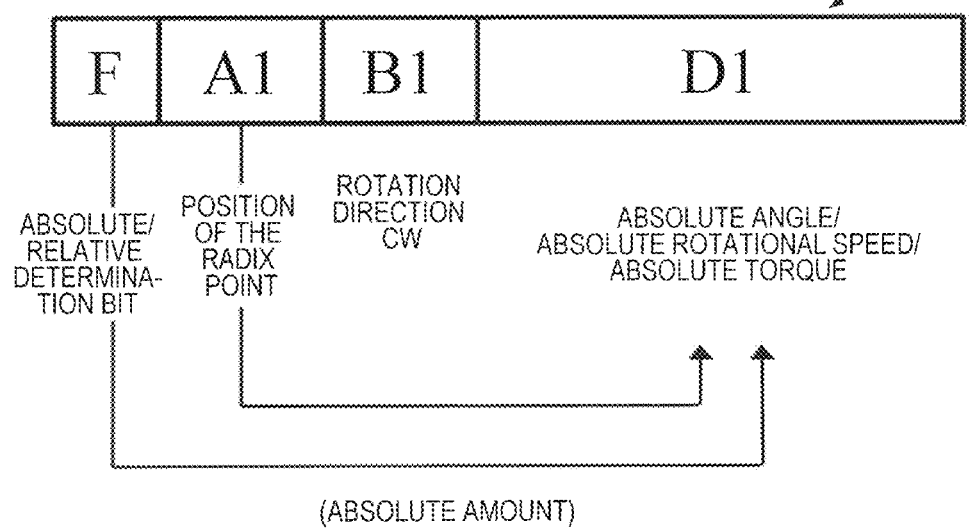
FIG. 8B is a diagram showing an exemplary command 12D in the case where a controlled variable D1 is designated in an absolute amount according to an example embodiment of the present disclosure.

FIG. 8B shows an exemplary command 12D in the case where a controlled variable D1 is designated in an absolute amount. In the command 12D, the contents of the position of the radix point A1, the rotation direction B1, and the controlled variable D1 are identical to those in the example of FIG. 5A. In the command 12D, however, absolute/relative determination bit F at the beginning is set to "0".

Next, a variant of the multi-motor system that performs communications between motor assemblies will be described.

The example of FIG. 3A has illustrated an implementation where a plurality of motor assemblies within the communication robot 30a communicate with one another. The examples of FIG. 3B and FIG. 3C have respectively illustrated an implementation where a plurality of motor assemblies within the powered exoskeleton suit 30b communicate with one another and an implementation where a plurality of motor assemblies within the commercial refrigerated showcase 30c communicate with one another. In any of these examples, communications between a plurality of motor assemblies that are included within a single system (i.e., a single product) are contemplated.

However, it would also be possible for motor assemblies that are respectively contained in different systems to communicate with one another.

Figure 9:
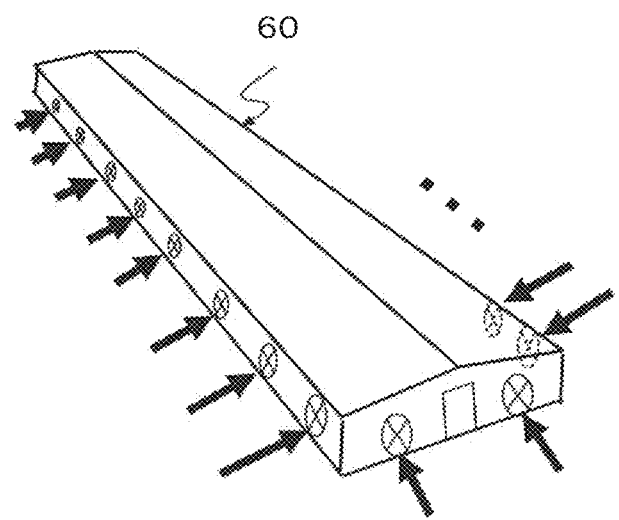
FIG. 9 is a diagram showing a person 50 wearing a powered exoskeleton suit 30b and a greenhouse 60 according to an example embodiment of the present disclosure.
Figure 9:
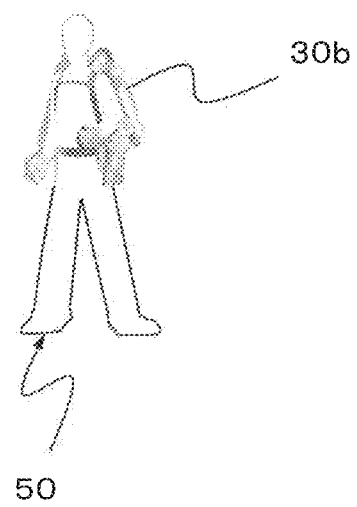

FIG. 9 shows a person 50 wearing a powered exoskeleton suit 30b and a greenhouse 60. In the greenhouse 60, a plurality of fan motor assemblies to rotate ventilation fans are provided at positions indicated with arrows.

An example where the person 50 does harvesting work for vegetables within the greenhouse 60. Wearing the powered exoskeleton suit 30b, the person 50 harvests vegetables with an assistance force from the powered exoskeleton suit 30b, and carries a harvesting basket accommodating the vegetables.

In this example, the plurality of motor assemblies on the powered exoskeleton suit 30b and the plurality of ventilation fans in the greenhouse 60 communicate with one another for cooperative operation.

For example, near the position where the person 50 is working by using the powered exoskeleton suit 30b, a temperature distribution due to heat buildup, etc., may be expected. Therefore, when the person is doing harvesting work with a harvesting basket, one or more motor assemblies on the powered exoskeleton suit transmit a notification to each fan motor assembly in the greenhouse 60 that it/they are currently operating. This notification allows each fan motor assembly in the greenhouse 60 to know that the person 50 is working by using the powered exoskeleton suit 30b.

In the present example embodiment, each fan motor assembly in the greenhouse 60 acquires information indicating the position of the powered exoskeleton suit 30b. The position of the powered exoskeleton suit 30b may be acquired by a well-known method. For example, a wireless tag may be internalized in the powered exoskeleton suit 30b, and a beacon signal which is transmitted from the wireless tag may be received by one or more antenna devices in the greenhouse 60. By using a well-known direction-of-arrival estimation algorithm, e.g., a maximum likelihood estimation method, a direction of arrival of the beacon signal can be estimated. As a result, the position of the wireless tag in the greenhouse 60, i.e., the position of the powered exoskeleton suit 30b, can be estimated.

Each fan motor assembly in the greenhouse 60 having acquired information of the position of the powered exoskeleton suit 30b autonomously controls rotation of its own motor. Any fan motor assembly that exists within a predetermined range, e.g. 15m, from the position of the powered exoskeleton suit 30b will make its rotational speed higher than usual. As a result, a temperature distribution can be prevented from occurring in the powered exoskeleton suit 30b.

Alternatively, any one of the motor assemblies on the powered exoskeleton suit 30b may give an instruction for causing rotation of the motor of a specific fan motor assembly in the greenhouse 60. In this case, controlled variables concerning the rotation direction and/or rotational speed of the motor can be designated by the above-described method.

Figure 10A:
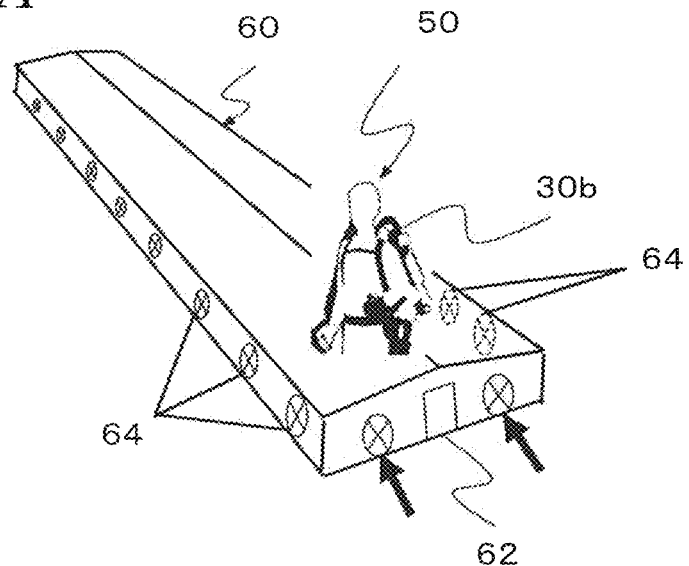
FIG. 10A is a diagram showing a plurality of fan motor assemblies 64 which increase their rotational speeds when the person 50 is engaged in harvesting work near an entrance 62 of the greenhouse 60 according to an example embodiment of the present disclosure.

FIG. 10A shows a plurality of fan motor assemblies 64 which increase their rotational speeds when the person 50 is engaged in harvesting work near an entrance 62 of the greenhouse 60.

Figure 10B:
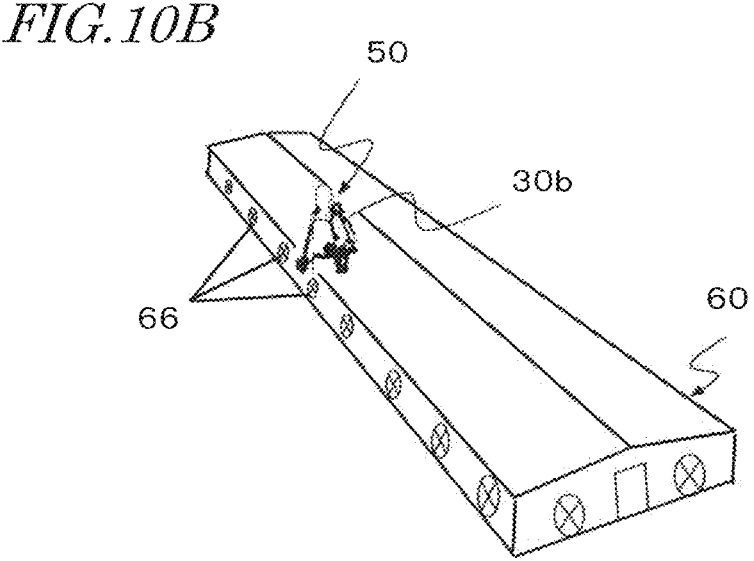
FIG. 10B is a diagram showing still another plurality of fan motor assemblies 66 which increase their rotational speeds as the person 50 moves according to an example embodiment of the present disclosure.

FIG. 10B shows still another plurality of fan motor assemblies 66 which increase their rotational speeds as the person 50 moves.

In either one of the examples of FIG. 10A and FIG. 10B, the fan motor assemblies other than the fan motor assemblies 64 and 66 are rotating at their usual rotational speeds.

Note that an amount of physical motion of the person 50 can be estimated from the level of total power consumption by the powered exoskeleton suit 30b. As each motor assembly on the powered exoskeleton suit 30b stores data indicating a power consumption level to a packet and transmits it, each fan motor assembly in the greenhouse 60 is able to calculate a level of total power consumption. In accordance with the level of total power consumption, the fan motor assemblies in the greenhouse 60 may increase or decrease the rotational speed of the motor. More specifically, a number of classifications may be defined according to levels of total power consumption, and if the total power consumption belongs in the highest classification, the relevant fan motor assembly may rotate its motor the fastest. In the meantime, a "predetermined range" for determining the relevant fan motor assembly may be expanded. On the other hand, if the total power consumption belongs in the lowest classification, the relevant fan motor assembly may rotate its motor at a rotational speed which is higher than its usual rotational speed but is not the fastest.

The powered exoskeleton suit 30b may also be utilized as a sensor for detecting motion of joint of the person 50. For example, suppose that the person 50 who has entered greenhouse 60 suddenly becomes ill and collapses. A quick treatment will be desired, and if the collapsed state continues for a long time, the person 50 may suffer from heatstroke depending on the room temperature within the greenhouse 60.

In anticipation of such situations, the powered exoskeleton suit 30b is monitoring to see if any motion of the person 50 is detectable for a predetermined time, e.g., 15 seconds. Through communications with one another, if it is detected that none of the motor assemblies has driven the motor for 15 seconds or more, each motor assembly transmits a packet corresponding to an emergency signal. The packet may contain, as an operation-type command, a 1-byte value "0x02" corresponding to "Write Data command", which indicates a data write, and as an attribute-type command, a 2-byte value "0x00" indicating an emergency.

Each fan motor assembly receiving the packet transmits to the upper device 150 a notification that a motor(s) on the "powered exoskeleton suit is sending out an emergency signal". In response to receiving the notification, the upper device 150 may report to a person in charge, or a family member, that an emergency has occurred. Receiving the report, the person in charge or family member may go to the greenhouse 60 in order to check on the person 50.

Note that the above-described example embodiment is an example, which does not limit the multi-motor system according to the present disclosure.

INDUSTRIAL APPLICABILITY

A command containing: position-designating data designating a position of the radix point; and control data, according to the present disclosure, is broadly applicable to any multi-motor system or any motor driving system that includes various motor assemblies whose controlled variables are in different units.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A multi-motor system comprising a plurality of motor assemblies, each of the plurality of motor assemblies including: a motor; a communication circuit to receive a command transmitted from outside; a control circuit to generate a control signal that rotates the motor with a controlled variable that is designated by the command; and a motor driving circuit to cause a current to flow in the motor based on the control signal; wherein the command includes; control data indicating the controlled variable of the motor in fixed data length, the controlled variable being expressed at least with an integer; and position-designating data designating a position of a radix point in the control data; and the position-designating data is independently determined for each motor assembly;

wherein the controlled variable is expressed by using an integer part and a fractional part;

wherein the position-designating data, data designating a rotation direction of the motor, and the control data are arranged in the command; and the control circuit extracts the integer part and the fractional part by using the position-designating data, and generates the control signal in accordance with the controlled variable including the extracted integer part and fractional part.

2. The multi-motor system of claim 1, wherein the command has a fixed length.

3. The multi-motor system of claim 2, wherein the command has a fixed length of 5 bytes.

4. The multi-motor system of claim 1, wherein
the position-designating data is 5 bits long; and
a number of digits from the radix point onwards is capable of expressing a $0^{th}$ digit to a $31^{st}$ digit in decimal representation.

5. The multi-motor system of claim 1, wherein the command includes control data designating the controlled variable of the motor in an absolute amount.

6. The multi-motor system of claim 5, wherein the command includes determination data indicating that the control data expresses the controlled variable of the motor in an absolute amount.

7. The multi-motor system of claim 1, wherein the command includes control data designating the motor of the controlled variable in a relative amount from a predetermined reference.

8. The multi-motor system of claim 7, wherein the command includes determination data indicating that the control data is expressed in a relative amount from the predetermined reference.

9. The multi-motor system of claim 2, wherein the command includes control data designating the controlled variable of the motor assembly in an absolute amount.

10. The multi-motor system of claim 2, wherein the command includes control data designating the motor of the controlled variable in a relative amount from a predetermined reference.

* * * * *